(12) United States Patent
Jeon et al.

(10) Patent No.: US 10,933,863 B2
(45) Date of Patent: Mar. 2, 2021

(54) APPARATUS AND METHOD FOR CONTROLLING ENGINE CLUTCH

(71) Applicants: Hyundai Motor Company, Seoul (KR); KIA Motors Corporation, Seoul (KR)

(72) Inventors: Sung-Bae Jeon, Ansan-si (KR); Sung-Deok Kim, Hwaseong-si (KR); Jin-Kyeom Cho, Anyang-si (KR); Hui-Un Son, Suwon-si (KR); Joon-Young Park, Seoul (KR); Jea-Mun Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 193 days.

(21) Appl. No.: 16/205,616

(22) Filed: Nov. 30, 2018

(65) Prior Publication Data
US 2019/0344782 A1    Nov. 14, 2019

(30) Foreign Application Priority Data
May 10, 2018 (KR) .................. 10-2018-0053727

(51) Int. Cl.
| | |
|---|---|
| *B60L 9/00* | (2019.01) |
| *B60W 20/50* | (2016.01) |
| *B60W 10/06* | (2006.01) |
| *B60W 10/10* | (2012.01) |
| *B60K 6/54* | (2007.10) |
| *B60K 6/48* | (2007.10) |
| *B60W 50/029* | (2012.01) |

(Continued)

(52) U.S. Cl.
CPC ............... *B60W 20/50* (2013.01); *B60K 6/48* (2013.01); *B60K 6/54* (2013.01); *B60W 10/06* (2013.01); *B60W 10/08* (2013.01); *B60W 10/10* (2013.01); *B60W 30/18036* (2013.01); *B60W 50/029* (2013.01); *B60K 2006/4825* (2013.01); *B60K 2006/541* (2013.01); *B60W 2510/0208* (2013.01); *B60W 2510/0638* (2013.01); *B60W 2710/1005* (2013.01); *B60W 2720/24* (2013.01); *B60Y 2200/92* (2013.01)

(58) Field of Classification Search
CPC combination set(s) only.
See application file for complete search history.

(56) References Cited

U.S. PATENT DOCUMENTS 10,598,071 B2 * 3/2020 Dudar ................. F02D 41/1444

FOREIGN PATENT DOCUMENTS

| KR | 10-1694019 B1 | 1/2017 |
| KR | 10-1776524 B1 | 9/2017 |

* cited by examiner

Primary Examiner — Adam M Alharbi
(74) Attorney, Agent, or Firm — Brinks Gilson & Lione

(57) ABSTRACT

An engine clutch control apparatus of a vehicle including a transmission without a R-shift stage gear may include an engine clutch, a controller which determines whether an engine reverse rotation entry is possible for driving in reverse according to a failure diagnosis information of the engine clutch and executes a reverse rotation driving control according to the determination result, and a drive motor for reversely rotating the transmission according the reverse rotation driving control. The controller in the engine clutch control apparatus includes an engine reverse rotation entry possibility determining module and an engine exhaust gas forced discharge control module.

20 Claims, 5 Drawing Sheets

(51) Int. Cl.
*B60W 30/18* (2012.01)
*B60W 10/08* (2006.01)

APPARATUS AND METHOD FOR CONTROLLING ENGINE CLUTCH

CROSS-REFERENCE TO RELATED APPLICATION

This application claims priority to and the benefit of Korean Patent Application No. 10-2018-0053727, filed on May 10, 2018, which is incorporated herein by reference in its entirety.

FIELD

The present disclosure relates to engine clutch control technology, and more particularly, to an apparatus and method for controlling an engine clutch for driving a vehicle in reverse without a reverse gear.

BACKGROUND

The statements in this section merely provide background information related to the present disclosure and may not constitute prior art.

In the case of a hybrid vehicle without a reverse gear (i.e., an R-shift stage gear), the basic method for driving in reverse is performed by engaging the first shift stage gear instead of engaging a reverse gear of a transmission, and rotating a drive motor in the reverse direction. Accordingly, the drive motor rotates in the reverse direction and the first shift stage gear of the transmission is engaged to perform the reverse rotation of the wheels. This structure can eliminate the reverse gear of the transmission.

However, we have discovered that the normally closed type engine clutch becomes a closed state in the state of a signal failure or the like, so that the release of the engine clutch is not possible. Accordingly, in a hybrid vehicle without a reverse gear, it is hard to drive in reverse when a fixing fault has occurred in the normally closed type engine clutch. In addition, when a failure has occurred in the engine clutch system, there is an emergency (for example, avoiding a dangerous area) desired for an R-shift stage driving.

Accordingly, in the absence of a reverse gear, the drive motor should perform a reverse rotation for driving in reverse. Since the engine and the drive motor cannot be released, the engine also reversely rotates so that the exhaust gas to be discharged flows back into the cylinder and/or the intake portion of the engine.

Therefore, there is a disadvantage in that failure of the exhaust purification apparatus and/or failure of the ignition timing at the time of restarting the engine can be caused so that it is impossible to drive the vehicle in reverse in this situation.

The above information disclosed in this Background section is only for enhancement of understanding of the background of the present disclosure, and therefore it may contain information that does not form the prior art that is already known to a person of ordinary skill in the art.

SUMMARY

The present disclosure provides an apparatus and a method for controlling an engine clutch capable of performing an R-shift stage running (i.e., driving in reverse) even in the situation of an engine clutch failure of a hybrid vehicle without a reverse gear.

The engine clutch control apparatus of a vehicle including a transmission without a R-shift stage gear may include, an engine clutch, a controller which determines whether an engine reverse rotation entry is possible for driving in reverse according to a failure diagnosis information of the engine clutch and executes a reverse rotation driving control in accordance with the determination result, and a drive motor for reversely rotating the transmission in accordance with the reverse rotation driving control.

According to a further aspect of the present disclosure, the controller may include an engine reverse rotation possibility determining module for determining whether the engine reverse rotation entry is possible using the fault diagnosis information and an engine passive run revolutions per minute (RPM), and an engine exhaust gas forced discharge control module for performing an exhaust gas forced discharge control which discharges exhaust gas by using an exhaust system volume and an engine cylinder volume information.

In addition, the engine reverse rotation entry may be performed when the passive run RPM exceeds a preset reference RPM. The reference RPM may be a RPM that discharges all of the exhaust gas in an exhaust system volume.

The reference RPM may be calculated by dividing the exhaust system volume by a product of an inner diameter of a cylinder, a stroke, and a number of cylinders of the engine.

The exhaust gas forced discharge control may be performed when the passive run RPM does not exceed the reference RPM after the engine driving is finished.

According to a further aspect of the present disclosure, the exhaust gas forced discharge control may release the transmission clutch in a brake engagement state of the vehicle for making the vehicle and the engine speed to be independent.

In addition, the exhaust gas forced discharge control may discharge the exhaust gas by performing the passive run in the forward rotation direction of the engine by using a generator in the transmission clutch release.

The forward RPM of the engine may be calculated by dividing the product of the exhaust system volume and a generator engine belt gear ratio by the product of the inner diameter of the cylinder, the stroke and the number of cylinders of the engine.

The failure diagnosis information may represents that the engine clutch is in a fixing state.

According to an aspect of the present disclosure, an engine clutch control method of a vehicle including a transmission without a R-shift stage gear may include the steps of determining, by a controller, whether an engine reverse rotation is possible for driving in reverse according to a failure diagnosis information of an engine clutch and executing a reverse rotation driving control in accordance with the determination result, and reversely rotating, by a drive motor, the transmission in accordance with the reverse rotation driving control.

According to a further aspect of the present disclosure, the method may further include the steps of determining, by an engine reverse rotation entry possibility determining module, whether the engine reverse rotation entry is possible using the failure diagnosis information and an engine passive run RPM (revolutions per minute), and performing, by an engine exhaust gas forced discharge control module, an exhaust gas forced discharge control that discharges the exhaust gas using an exhaust system volume and an engine cylinder volume information.

In accordance with present disclosure, in a hybrid vehicle without a reverse gear, even if the engine clutch is fixed, the passive run Revolutions per minute (RPM) of the engine is determined to be sufficient for discharging the engine exhaust gas, so that the vehicle can be driven in reverse in each situation. If it is determined that the engine exhaust gas can be discharged, the vehicle is immediately driven in reverse. If the exhaust gas of the engine remains, the forced discharge control of the exhaust gas of the engine is performed to allow the vehicle to be driven in reverse.

Furthermore, according to the present disclosure, the safety and the commerciality of the vehicle can be improved by providing fail-safety in the event of engine clutch fixing failure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
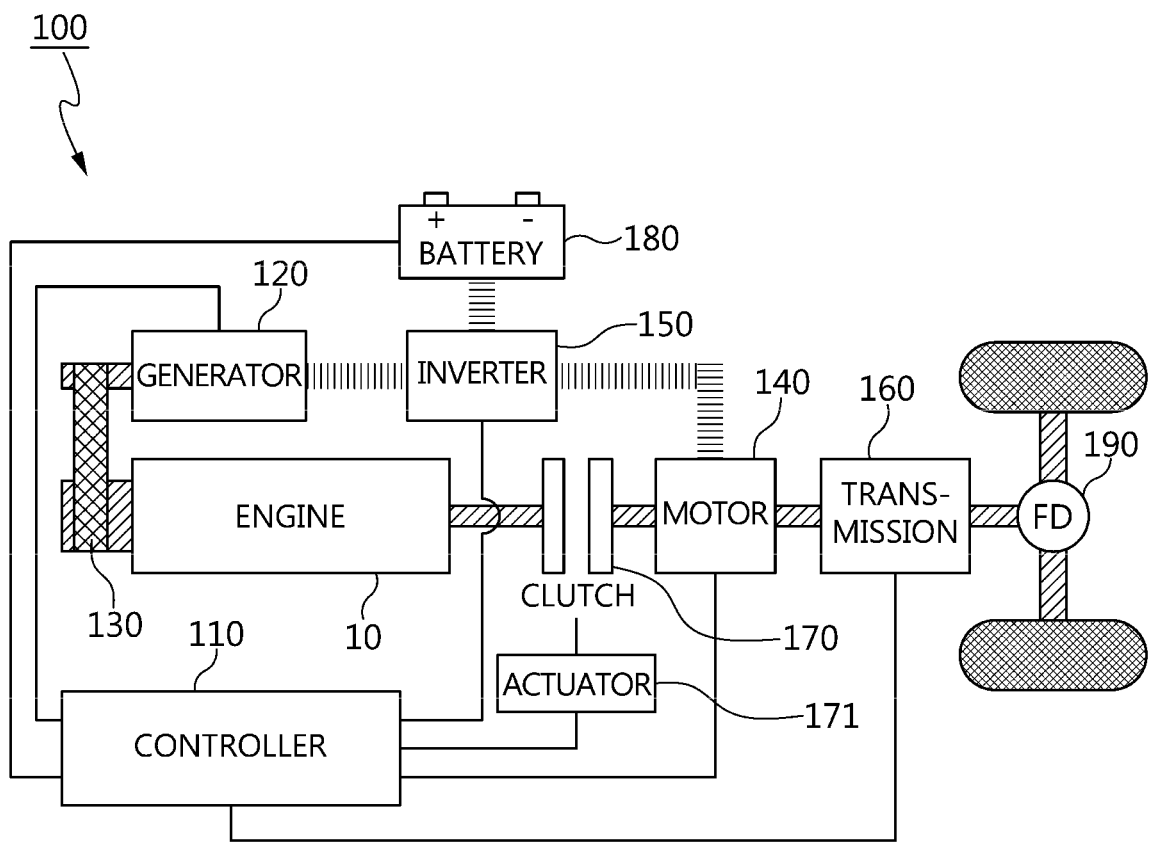
FIG. 1 is a block diagram of an apparatus for controlling an engine clutch according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The terms first, second, etc. may be used to describe various components, but the components should not be limited by the terms. The terms are used only for distinguishing one component from another. For example, without departing from the scope of the present disclosure, a first component may be named a second component, and similarly a second component may be named a first component. The term "and/or" includes any combination of a plurality of related listed items or any of a plurality of related listed items.

Unless otherwise defined, all terms used herein, including technical or scientific terms, have the same meaning as commonly understood by one of ordinary skill in the art to which the present disclosure pertains. Terms such as those defined in commonly used dictionaries should be interpreted as having a meaning consistent with the meaning in the context of the relevant art and should not be interpreted as ideal or overly formal in meaning unless explicitly defined in the present application.

FIG. 1 is a block diagram of an engine clutch control apparatus 100 according to a form of the present disclosure. Referring to FIG. 1, the engine clutch control apparatus 100 includes an engine 10, an engine clutch 170 and a controller 110. The controller 110 determines whether the engine reverse rotation entry is possible for driving in reverse according to the failure diagnosis information of the engine clutch 170 and executes a reverse rotation driving control in accordance with the determination result. The engine clutch control apparatus 100 further includes a drive motor 140 for reversely rotating the transmission without a reverse gear in accordance with the reverse rotation driving control, and a generator 120 for starting the engine 10 or generating electricity through the engine 10, and the like.

The engine 10 may include a continuous variable valve timing (CVVT), an application (double overhead camshaft), a continuous valve timing (CAT), a gasoline direct injection (GAI), a multipoint injection (MPI) engine using gas as fuel, a common rail direct injection (CRDI), a high direction turbo intercooler (HTI), a variable geometry turbocharger (VGT) engine using diesel as fuel, and a liquid propane injection (LPI) engine using gas as fuel, and the like.

The controller 110 may perform an electric vehicle (EV) mode, a series mode, and a parallel mode, and the like by using the generator 120, the drive motor 140, an inverter 150, a transmission 160, the engine clutch 170, and the like.

In the EV mode, the engine clutch 170 is opened, and the drive motor 140 drives the vehicle using the power of the battery 180. In the case of the series mode, the clutch 170 is opened and the power of the engine 10 is used to generate the generator 120, and the drive motor drives the vehicle by using the generated electric power. In the case of the parallel mode, the engine clutch 170 is locked, and the engine 10 and the drive motor 140 distribute the power to drive the vehicle together. In particular, FIG. 1 is a diagram showing a power train structure of the hybrid vehicle having a transmission mounted electric device (TMED) without a reverse gear.

As shown in FIG. 1, the generator 120 is connected to the crankshaft of the engine 10 via a belt 130. Accordingly, the generator 120 is used as an electric motor at the time of starting to rotate the engine 10, and generated by the rotation of the engine 10 at the time of power generation.

An inverter 150 converts the DC power from the battery 180 and supplies the three-phase AC power to the driving motor 140. The inverter 150 uses a Pulse Width Modulation (PWM) inverter, which is a voltage-type inverter but the present disclosure is not limited thereto and it is possible to apply a current type inverter by modifying some components. In the PWM inverter, for example, a rectified DC voltage is controlled by a Pulse Width Modulation (PWM) control method simultaneously with voltage and frequency.

The engine clutch 170 may connect or disconnect the power between the engine 10 and the transmission 160 depending on the running condition of the vehicle. Therefore, the engine clutch 170 connects the engine 10 and the drive motor 140 when switching to the parallel mode (i.e., the hybrid running mode), and disconnects the engine 10 from the drive motor 140 when switching to the EV mode.

In FIG. 1, an actuator 171 is configured to operate the engine clutch 170. The actuator 171 keeps an engine side disk (not shown) and a motor side disk (not shown) in a locked state or an unlocked state by the force of a hydraulic pressure caused by the driving force of a motor (not shown). The actuator 171 receives and operates the control signal of the controller 110 by an electronic circuit.

The transmission 160 performs a function of transmitting the power of the engine 10 and/or the driving motor 140 to a driving gear, or final reduction & differential gear 190 that drives wheels through gear shifting.

The battery 180 is configured in series and/or in parallel with a battery cell (not shown), which is a high voltage battery for an electric vehicle such as a nickel metal battery cell, a lithium ion battery cell, a lithium polymer battery cell, all-solid battery cell, and the like. Generally, a high voltage battery is the battery used as a power source for moving an electric vehicle and refers to a high voltage of 100 V or more. However, it is not limited to this, and a low voltage battery can be used.

With continued reference to FIG. 1, an electrical path may be formed between the generator 120, the drive motor 140, the inverter 150, and the batteries 180. On the other hand, a mechanical path may be formed between the engine 10, the generator 120, the engine clutch 170, the drive motor 140, the transmission 160, and the drive gears 190.

In the mechanical path, the drive motor 140, the transmission 160, the drive gear 190, and the engine 10 are all reversely rotated together in driving in reverse since the reverse gear (i.e., the R-shift stage gear) is not configured in the transmission 160. In other words, when a failure occurs in the engine clutch 170 placed between the drive motor 140 and the engine 10, the drive motor 140 and the engine 10 operate as if they are connected to one. Thus, the exhaust gas to be discharged while the engine 10 is reversely rotated is introduced into the cylinder and the intake portion side of the engine 10 inversely. This can lead to failure of the exhaust purifier (not shown) and ignition timing error upon restarting of the engine. Accordingly, in the exemplary form of the present disclosure, it is determined whether the exhaust gas discharge of the engine 10 is sufficient when a failure is occurred in the engine clutch 170 to allow the vehicle to drive in reverse in each situation.

Figure 2:
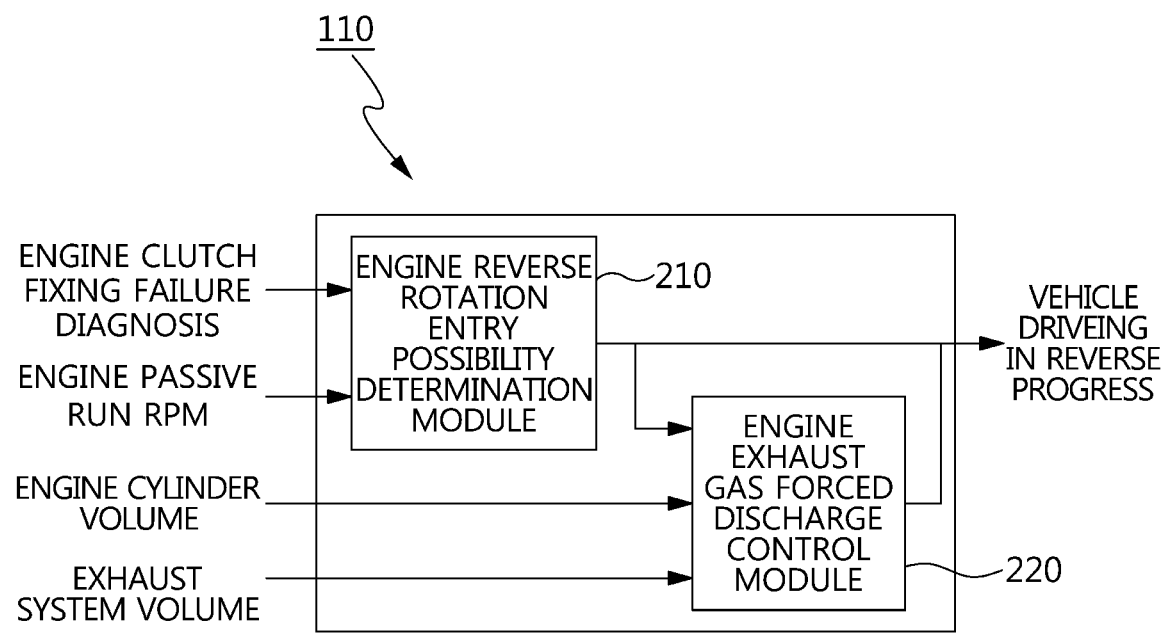
FIG. 2 is a detailed block diagram of the controller shown in FIG. 1.

FIG. 2 is a detailed block diagram of the controller 110. Referring to FIG. 2, the controller 110 includes an engine reverse rotation entry possibility determining module 210 for determining whether or not engine reverse rotation entry is possible by using a fault diagnosis information and an engine passive run revolution per minute (RPM), and an engine exhaust gas forced discharge control module 220 for performing an exhaust gas forced discharge control which discharges exhaust gas by using the exhaust system volume and engine cylinder volume information, and the like.

The failure diagnosis information indicates the information according to the fixing failure diagnosis of the engine clutch 170. Generally, the controller 110 compares the revolutions per minute (RPM) on the engine 10 with the RPM on the drive motor 140 to determine as failure when there is a difference therebetween. In other words, the speed difference between the front end and the rear end of the engine clutch 170 in the open state of the engine clutch 170 is calculated to determine the fixing state. Of course, in order to measure these RPMs, resolvers, sensors, etc. may be installed on the engine and drive motor side. Also, the fixing failure diagnosis of the engine clutch 170 can be performed by various other methods. For example, it is also possible to determine the fixing of the engine clutch 170 by using the pressure corresponding to the stroke change of the actuator 171. This is disclosed in Korean Registration Patent No. 10-1776524, granted on Sep. 1, 2017. 09.01, which is incorporated herein by reference, and the like.

The passive run RPM of the engine represents the RPM of the engine 10 rotating by the other power source. In other words, in the case of the passive run, the engine 10 is in a state of being rotated synchronously with the rotation of the drive motor 140 or the generator 120.

The exhaust system volume information and/or the engine cylinder volume information have an average value through experiments in advance. The exhaust system volume represents the volume occupied by the exhaust system of the vehicle, and the engine cylinder volume represents the total exhaust amount.

The term "module" as shown in FIG. 2 means a unit for processing at least one function or operation, which may be implemented by hardware or software or a combination of hardware and software. In particular, in a hardware implementation, it may be implemented as an application specific integrated circuit (ASIC), a digital signal processing (DSP), a programmable logic device (PLD), a field programmable gate array (FPGA), a processor, a controller, a microprocessor, another electronic unit, or a combination thereof. In a software implementation, it may be implemented as a module that performs the functions described above. The software may be stored in a memory unit and executed by a processor. The memory unit or processor may employ various means well-known to those skilled in the art.

Figure 3:
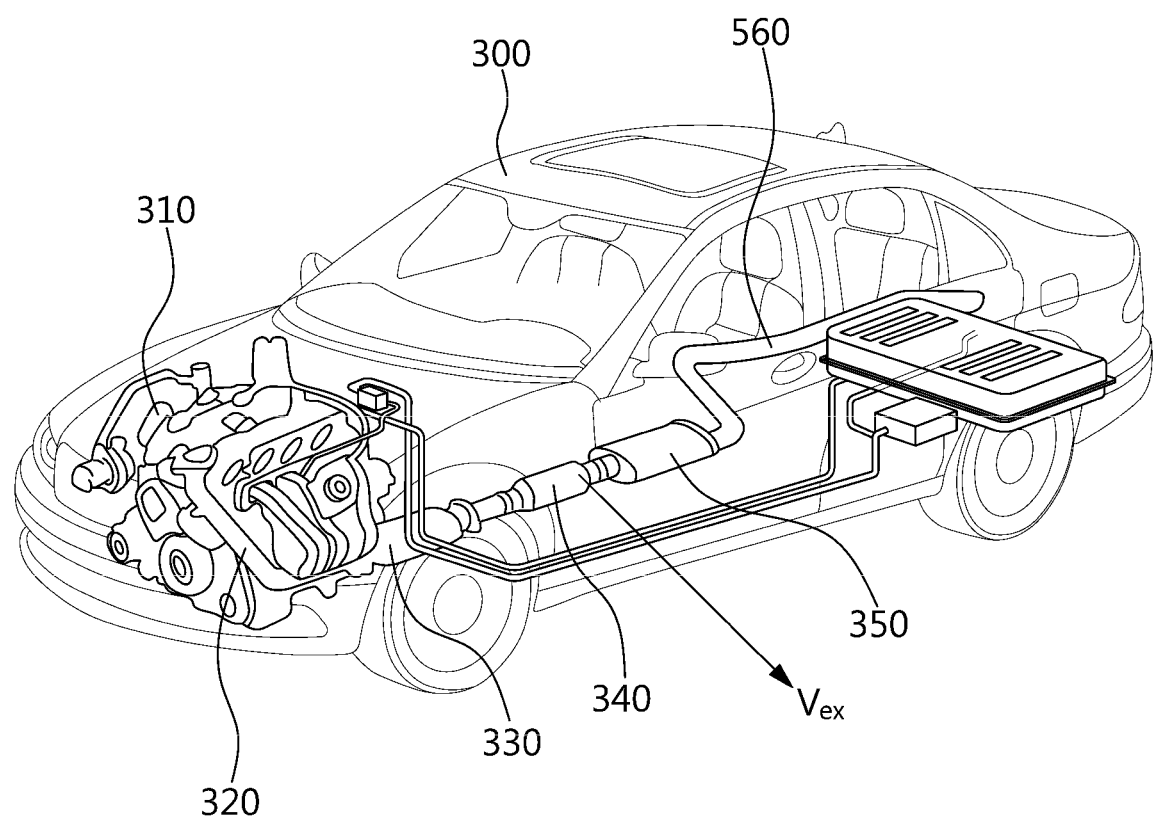
FIG. 3 is a configuration diagram of a vehicle according to an exemplary form of the present disclosure.

FIG. 3 is a configuration diagram of a vehicle. Referring to FIG. 3, the exhaust system of a vehicle 300 includes an exhaust manifold 310 installed at the exhaust side of the engine 10, an exhaust down pipe 320 connected to the exhaust manifold 310, a catalytic converter 330 connected with the outlet side of the exhaust down pipe 320 for converting noxious gas harmful to the human body among the exhaust gas into harmless components using a catalytic, a resonator 340 connected to the outlet side of the catalytic converter 330 for reducing noises of the engine sound, a muffler 350 connected to the outlet side of the resonator 340, and a tail pipe 560 connected to the outlet side of the muffler 350.

Figure 4:
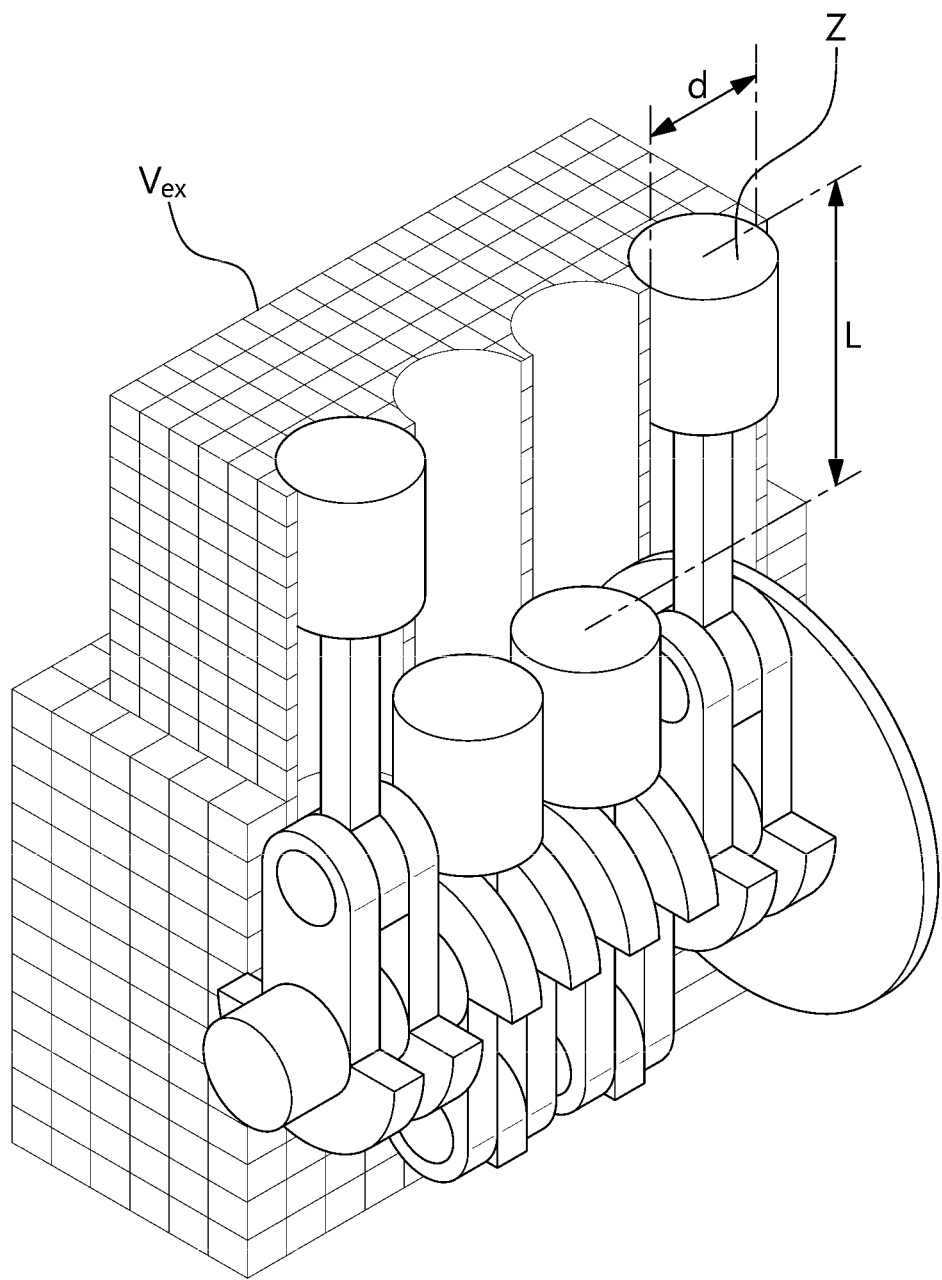
FIG. 4 is a conceptual diagram showing an exhaust gas emission amount calculation of the engine shown in FIG. 1.

FIG. 4 is a conceptual diagram showing the exhaust gas emission amount calculation of the engine 10 shown in FIG. 1. Referring to FIG. 4, when an engine clutch fixing failure is occurred so that the engine 10 is not driven not for generating exhaust gas, it is determined that the driving in reverse can be possible by reversely rotating the engine. In FIG. 4, Vex represents the exhaust system volume; d represents the cylinder inner diameter; $N_{pas}$ represents the passive run speed; L represents the stroke of the cylinder; and Z the number of cylinders, respectively.

Figure 5:
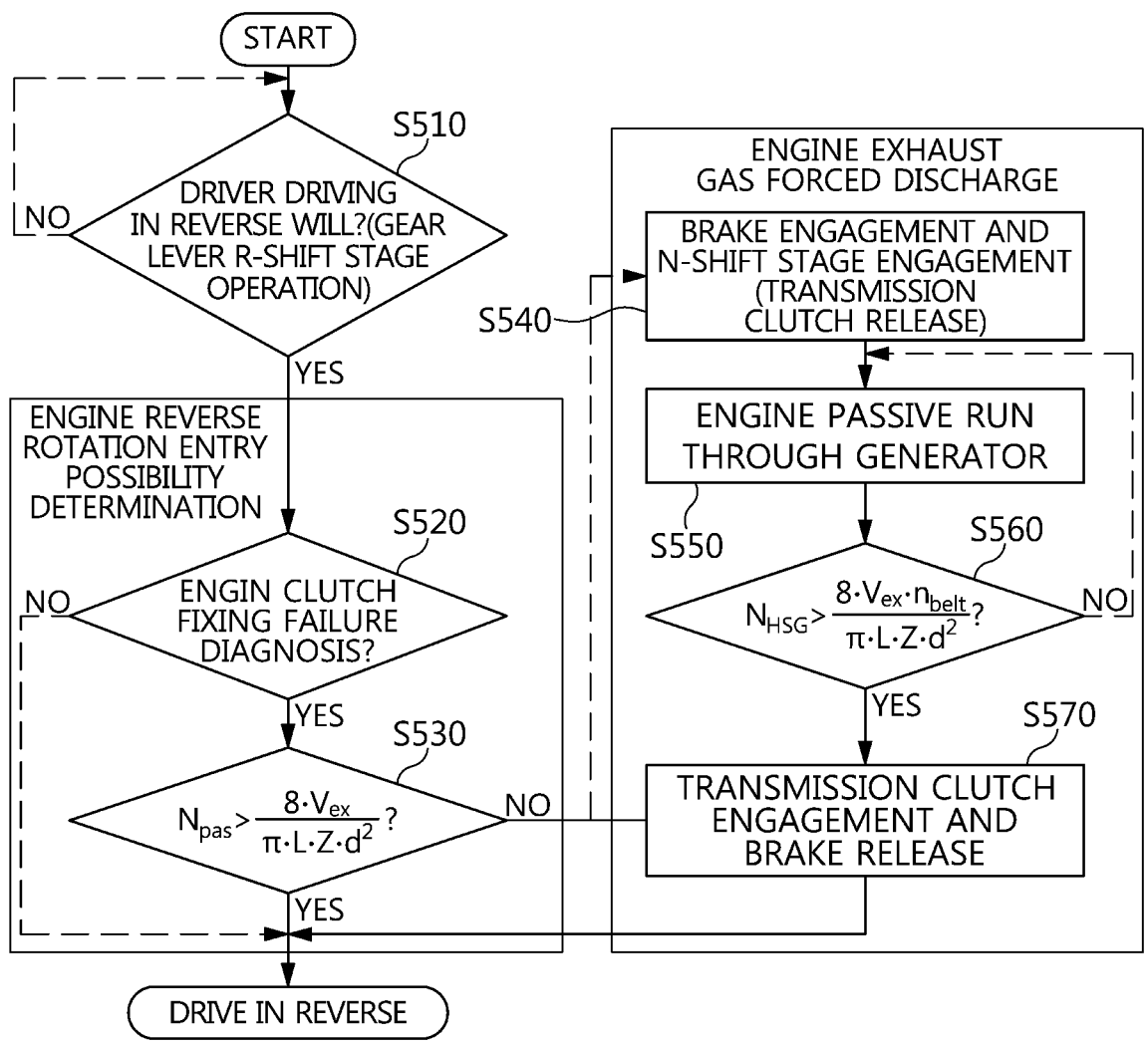
FIG. 5 is a flowchart illustrating a procedure for diagnosing an engine clutch fixing fault and driving a vehicle in reverse according to an exemplary form of the present disclosure.

In other words, since the reverse gear is not configured in the transmission 160, the basic method for driving the vehicle in reverse is to perform the driving in reverse by engaging the first shift stage gear of the transmission instead of engaging the reverse gear and rotating the drive motor 140 in the reverse direction. In this case, if the engine clutch 170 is not opened, the engine 10 is also rotated in the reverse direction, so that the exhaust gas can be adversely introduced into the cylinder and/or the intake portion (not shown) of the engine 10. Thus, in the exemplary form of the present disclosure, this exhaust gas is efficiently discharged for the driving in reverse. FIG. 5 shows a conceptual illustration of an exhaust process.

FIG. 5 is a flowchart illustrating a procedure for diagnosing an engine clutch fixing failure according to the exemplary form of the present disclosure and driving the vehicle in reverse. Referring to FIG. 5, the controller (110 of FIG. 1) determines whether there is a driving in reverse command according to the driving in reverse will of the driver (step S510). The driving in reverse will may be the R-shift stage operation of a gear lever.

In the step S510, if there is a driving in reverse command, the controller 110 first determines whether the engine reverse rotation entry is possible. In other words, the controller 110 confirms the fixing failure diagnosis of the engine clutch 170 (step S520). That is, the controller 110 determines whether a fixing failure has occurred in the engine clutch 170 through the acquired failure diagnosis information.

According to the result, if it is determined in step S520 that there is no failure, the controller 110 controls the drive motor 140 to reversely rotate the transmission 160 without the reverse gear in accordance with the reverse rotation drive control. Otherwise, if the fixing failure has occurred in step S520, the controller 110 determines whether the passive run speed $N_{pas}$ of the engine 10 is greater than a preset reference value (step S530). In other words, the passive rotation number $N_{pas}$ is compared with the preset reference value and this may be expressed by the following equation.

$$N_{pas} > \frac{8 \cdot V_{ex}}{\pi \cdot L \cdot Z \cdot d^2} \qquad \text{[Equation 1]}$$

Where Vex is the exhaust system volume, d is the cylinder inner diameter, $N_{pas}$ is the passive run RPM, L is the stroke of the cylinder, and Z is the number of cylinders. The volume of the engine cylinder can be expressed by the following equation.

$$\frac{\pi d^2}{4} \cdot L \cdot Z \qquad \text{[Equation 2]}$$

In other words, the passive run RPM $N_{pas}$ represents an excess amount of the RPM that can exhaust all of the exhaust gas remaining in the exhaust system after the driving of the engine 10 is finished.

In step S530, when the passive run RPM $N_{pas}$ exceeds the reference value, the controller 110 controls the drive motor 140 to reversely rotate the transmission without the reverse gear according to the reverse rotation drive control. Otherwise, in step S530, if the passive run RPM $N_{pas}$ does not exceed the reference value, the exhaust gas remains in the exhaust system, so that the controller 110 performs the exhaust gas forced discharge control for forcibly discharging the exhaust gas. In other words, the controller 110 performs the transmission clutch release in the brake engagement state of the vehicle to make the vehicle and the speed of the engine to be independent (step S540). In other words, the transmission 160 is engaged to N-shift stage.

Then, the controller 110 performs the passive run of the engine 10 in the forward rotation direction by using the generator 120 in the transmission clutch release to exhaust the exhaust gas (step S550).

At this step, the forward RPM of the engine 10 is compared with a preset reference value (step S560). This can be expressed by the following equation.

$$N_{HSG} > \frac{8 \cdot V_{ex}}{\pi \cdot L \cdot Z \cdot d^2} \cdot n_{belt} \qquad \text{[Equation 3]}$$

Where Vex is the exhaust system volume, d is the cylinder inner diameter, $N_{HSG}$ is the forward RPM, L is the stroke of the cylinder, and Z is the number of cylinders. In addition, $n_{belt}$ represents the generator engine belt gear ratio, which is a preset value.

If it is smaller than the reference value in step S560, the controller 110 proceeds to step S550 to perform the passive run. Otherwise, in step S560, if it is greater than the reference value, the controller 110 performs the transmission clutch engagement and releases the brake so that the controller 110 rotates the drive motor 140 in the reverse direction.

Further, the steps of a method or algorithm described in connection with the exemplary forms disclosed herein may be embodied in a form of program commands, which may be performed via a variety of computing means, and recorded in a computer-readable medium. The computer-readable medium may include program (command) codes, data files, data structures, etc., alone or in combination The program (command) codes recorded on the medium may be those specially designed and configured for present disclosure or may be known and available to those skilled in the art of computer software. Examples of computer-readable medium may include magnetic media such as hard disks, floppy disks and magnetic tape, optical media such as CD-ROMs, DVDs, Blu-ray, and the like, and a semiconductor memory element specifically configured to store and execute program (command) codes such as ROM, RAM, flash memory, and the like.

Herein, examples of program (command) codes may include machine language codes such as those produced by a compiler, as well as high-level language codes that can be executed by a computer using an interpreter or the like. The hardware devices described above may be configured to operate as one or more software modules to perform the operations of present disclosure, and vice versa.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. An engine clutch control apparatus of a vehicle including a transmission without a reverse (R)-shift stage gear, the engine clutch control apparatus comprising:
   an engine clutch;
   a controller configured to: diagnose whether the engine clutch is failed, and
   when the failure of the engine clutch is diagnosed, determine whether an engine reverse rotation is possible for driving in reverse according to a failure diagnosis information of the engine clutch and executing a reverse rotation driving control according to the determination result; and
   a drive motor mechanically connected to the transmission not having the R-shift stage gear and configured to reversely rotate the transmission according to the reverse rotation driving control.

2. The engine clutch control apparatus of claim 1, wherein the controller comprises:
   an engine reverse rotation entry possibility determining module for determining whether the engine reverse rotation entry is possible by using the failure diagnosis information and an engine passive run revolutions per minute (RPM); and
   an engine exhaust gas forced discharge control module for performing an exhaust gas forced discharge control which discharges exhaust gas by using an exhaust system volume and an engine cylinder volume information.

3. The engine clutch control apparatus of claim 2, wherein the engine reverse rotation entry is performed when the passive run RPM exceeds a preset reference RPM.

4. The engine clutch control apparatus of claim 3, wherein the reference RPM is a RPM that discharges all of the exhaust gas in the exhaust system volume.

5. The engine clutch control apparatus of claim 3, wherein the reference RPM is calculated by dividing the exhaust system volume by a product of an inner diameter of a cylinder, a stroke, and a number of cylinders of the engine.

6. The engine clutch control apparatus of claim 3, wherein the exhaust gas forced discharge control is performed when the passive run RPM does not exceed the reference RPM after the engine driving is finished.

7. The engine clutch control apparatus of claim 6, wherein the exhaust gas forced discharge control releases a transmission clutch in a brake engagement state of the vehicle for making the vehicle and the engine speed to be independent.

8. The engine clutch control apparatus of claim 7, wherein the exhaust gas forced discharge control discharges the exhaust gas by performing the passive run in a forward rotation direction of the engine by using a generator in the transmission clutch release.

9. The engine clutch control apparatus of claim 8, wherein a forward RPM of the engine is calculated by dividing a product of the exhaust system volume and a generator engine belt gear ratio by a product of a cylinder inner diameter, a stroke and a number of cylinders of the engine.

10. The engine clutch control apparatus of claim 1, wherein the failure diagnosis information represents that the engine clutch is in a fixing state.

11. An engine clutch control method of a vehicle including a transmission without a reverse (R)-shift stage gear, the engine clutch control method comprising the steps of:
   diagnosing, by a controller, whether the engine clutch is failed;
   when the failure of the engine clutch is diagnosed, determining, by the controller, whether an engine reverse rotation is possible for driving in reverse according to a failure diagnosis information of an engine clutch and executing a reverse rotation driving control according to the determination result; and
   reversely rotating, by a drive motor mechanically connected to the transmission not having the R-shift stage gear, the transmission according to the reverse rotation driving control.

12. The engine clutch control method of claim 11, wherein the method further comprises the steps of:
   determining, by an engine reverse rotation entry possibility determining module, whether the engine reverse rotation entry is possible using the failure diagnosis information and an engine passive run RPM (revolutions per minute); and
   performing, by an engine exhaust gas forced discharge control module, an exhaust gas forced discharge control that discharges the exhaust gas using an exhaust system volume and an engine cylinder volume information.

13. The engine clutch control method of claim 12, wherein the engine reverse rotation entry is performed when the passive run RPM exceeds a preset reference RPM.

14. The engine clutch control method of claim 13, wherein the reference RPM is a RPM that discharges all of the exhaust gas in the exhaust system volume.

15. The engine clutch control method of claim 13, wherein the reference RPM is calculated by dividing the exhaust system volume by a product of an inner diameter of a cylinder, a stroke, and a number of cylinders of the engine.

16. The engine clutch control method of claim 13, wherein the exhaust gas forced discharge control is performed when the passive run RPM does not exceed the reference RPM after the engine driving is finished.

17. The engine clutch control method of claim 16, wherein the exhaust gas forced discharge control releases a transmission clutch in a brake engagement state of the vehicle for making the vehicle and the engine speed to be independent.

18. The engine clutch control method of claim 17, wherein the exhaust gas forced discharge control discharges the exhaust gas by performing the passive run in a forward rotation direction of the engine by using a generator in the transmission clutch release.

19. The engine clutch control method of claim 18, wherein a forward RPM of the engine is calculated by dividing a product of the exhaust system volume and a generator engine belt gear ratio by a product of an inner diameter of a cylinder, a stroke and a number of cylinders of the engine.

20. The engine clutch control method of claim 11, wherein the failure diagnosis information of the engine clutch represents that the engine clutch is in a fixing state.

* * * * *